United States Patent
Schweizer et al.

(10) Patent No.: US 7,061,472 B1
(45) Date of Patent: Jun. 13, 2006

(54) PRESENTATION DEVICE

(75) Inventors: Joachim Schweizer, München (DE); Maximilian Rüttiger, München (DE)

(73) Assignee: Jopet GmbH & Co. KG, Norderstedt (DE)

( * ) Notice: Subject to any disclaimer, the term of this patent is extended or adjusted under 35 U.S.C. 154(b) by 0 days.

(21) Appl. No.: 09/979,897

(22) PCT Filed: May 26, 2000

(86) PCT No.: PCT/DE00/01710

§ 371 (c)(1),
(2), (4) Date: Apr. 25, 2002

(87) PCT Pub. No.: WO01/02536

PCT Pub. Date: Jan. 11, 2001

(30) Foreign Application Priority Data

May 28, 1999 (DE) .................................. 199 24 694
Oct. 29, 1999 (DE) .................................. 199 52 485
Oct. 29, 1999 (DE) .................................. 199 52 486

(51) Int. Cl.
*G09G 5/00* (2006.01)

(52) U.S. Cl. ........................ 345/168; 345/156; 345/169; 361/681

(58) Field of Classification Search ................ 345/168, 345/169, 173, 1.1–23
See application file for complete search history.

(56) References Cited

U.S. PATENT DOCUMENTS

| 5,262,926 | A | * | 11/1993 | Hall ........................... 361/681 |
| 5,414,444 | A | * | 5/1995 | Britz .......................... 345/156 |
| 5,508,720 | A | * | 4/1996 | DiSanto et al. ............. 345/169 |
| 5,644,338 | A | * | 7/1997 | Bowen ....................... 345/168 |
| 5,739,810 | A | * | 4/1998 | Merkel ....................... 345/156 |
| 5,926,364 | A | * | 7/1999 | Karidis ....................... 361/681 |
| 5,949,643 | A | * | 9/1999 | Batio .......................... 361/681 |
| 5,966,284 | A | * | 10/1999 | Youn et al. ................. 361/680 |
| 6,006,243 | A | * | 12/1999 | Karidis ....................... 708/100 |
| 6,144,358 | A | * | 11/2000 | Narayanaswamy et al. .. 345/102 |
| 6,295,038 | B1 | * | 9/2001 | Rebeske ..................... 345/1.1 |
| 6,297,752 | B1 | * | 10/2001 | Ni ............................... 341/22 |
| 6,304,431 | B1 | * | 10/2001 | Kim ........................... 361/680 |
| 6,327,482 | B1 | * | 12/2001 | Miyashita ................... 455/566 |
| 6,341,061 | B1 | * | 1/2002 | Eisbach et al. ............. 361/687 |
| 6,492,974 | B1 | * | 12/2002 | Nobuchi et al. ............ 345/156 |
| 6,700,773 | B1 | * | 3/2004 | Adriaansen et al. ........ 361/680 |
| 6,836,404 | B1 | * | 12/2004 | Duarte ....................... 361/680 |

* cited by examiner

*Primary Examiner*—Sumati Lefkowitz
*Assistant Examiner*—Alecia D. Nelson
(74) *Attorney, Agent, or Firm*—Henry M. Feiereisen

(57) ABSTRACT

The invention relates to a presentation device which is primarily designed for advising customers while conducting visits outside of the office. A laptop computer with a detachable keyboard (1) has a second display screen (5) located under the same. A primary display screen (2) can be pivoted around an angle of at least 220° so that, during a presentation, two people located opposite one another can each view a display screen. The presentation device can also be used as a conventional laptop.

7 Claims, 4 Drawing Sheets

PRESENTATION DEVICE

The invention concerns a presentation device, which is primarily designed for advising customers by agents in the field.

If a consultation or sales discussion is conducted at the customer's site, the available space is often not suitable for an optimal presentation, i.e., a modern presentation means, such as, e.g., an overhead projector with an LC display or a video projector, cannot be utilized. If, for example, insurance agents or financial service providers visit customers in their homes, it is not possible to set up a wall for projection. And such rearrangements of the room will be discouraged by most customers. It is thus usual to make calculations and diagrams on a piece of paper and then to rotate the paper halfway to the customer so that he can follow the additional written explanation. It is also possible to utilize a laptop computer, but this introduces problems, since [both] the salesman and the customer must both observe a relatively small display screen.

It has been shown that a presentation with a computer offers a number of advantages. The most varied types of life insurance can be calculated e.g., by means of special software and can be presented immediately graphically, i.e., easy to understand and thus convincing. Since this presentation technique is being continuously further developed and is accepted as very convenient by the customer, there is an urgent need to utilize this technique also for small presentation use on site, i.e., in the customer's residence or in a small office space.

Small modern computers, such as, e.g., small notebooks, due to their high computing power, in principle, offer the possibility of also applying programming and memory-intensive, i.e., demanding, presentation software. Thus, a convincing presentation would also be possible on site at the customer's location, if the above-named problem of space limitations could be solved.

It was proposed for this purpose, e.g., in the German GBM [Utility Model] 94 06985 to connect another flat display screen by means of a hinge to a conventional laptop with flat display screen on its upper edge, so that two-persons sitting across from each other can each view one display screen. This device is suitable in principle for the provided case of application, but is very cumbersome in operation. Therefore, there is the need for a further improvement of the presentation quality, for another decrease in cost, for a reduction in weight, or for an improved ease of operation.

The object of the invention consists of creating a computer-supported presentation device, which makes possible a convincing presentation even under very limited spatial constraints and is easy to operate.

The object is solved with a device according to claim 1. The presentation device is a conventional laptop computer with a removable keyboard and a main display screen that can be rotated out, which is applied onto the base unit of the laptop computer when folded in and covers the keyboard.

According to the invention, another display screen is arranged under the keyboard in the base unit of the laptop computer, which is also connected to the laptop computer. In addition, the hinge of the main display screen that can be rotated out is designed so that the main display screen can be rotated by at least approximately 220 degrees.

The presentation device can be utilized as a conventional laptop computer, whereby the keyboard can be removed as desired.

If a second person is to be shown a presentation, the main display screen can be rotated out by at least 220 degrees or more, so that the second person can now view the main display screen. The image of the main display screen is rotated by 180 degrees by a control device.

The operator controls the presentation by means of the keyboard, a mouse or other input devices and follows the course of the presentation on the second display screen, which is arranged under the keyboard in the base unit of the laptop computer, whereby the keyboard does not lie on the base unit during the presentation, but is connected in a wireless manner to the computer.

The principal advantage of this form of embodiment of the invention in comparison to GBM [Utility Model] 94 06985 consists of the fact that no additional mechanical holding device is necessary for the second display screen, since the display screen is integrated directly in the base unit of the laptop and is held there in a mechanically stable manner. By these measures, the costs and the total weight of the presentation device are considerably decreased in comparison to the solution according to GBM [Utility Model] 94 06985. In addition, handling is improved.

The second display screen can be turned on and the image of the main display screen can be swung out selectively by a switch or by keyboard input manually. However, an automatic turning on and rotation of the image according to claim 2, e.g., by arranging a device that recognizes the turning angle coupled to the hinge, which causes the image of the main display screen to rotate by 180 degrees and also to turn on the second image screen when a predetermined rotating angle of the main display screen is present.

According to claim 3, the second display screen is smaller than the main display screen. This enhancement is advantageous, if, e.g., a time-consuming graphic is to be shown to the customer, that is, e.g., an attractive and convincing presentation. The operator, i.e., the salesman, does not require this high-value presentation. He needs only to be able to follow the presentation and to be able to examine the correctness of the input of data, e.g., the personal data of the customer, if such inputs are made.

Since the second display screen also requires a smaller resolution, it is more cost-favorable than the main display screen, whereby the total costs can be further decreased.

The object of the invention is also solved with a device according to claim 4.

The presentation device is a laptop computer with a keyboard that can be pulled out and a main display screen that can be rotated out, which lies on the base unit of the laptop computer and covers the keyboard when it is pushed in.

According to the invention, another display screen, which is also controlled by the laptop computer, is arranged under the keyboard in the base unit. In addition, the hinge of the main display screen that can be rotated out is configured in such a way that the main display screen can be rotated by at least 220 degrees.

The presentation device can be utilized as a conventional laptop computer, wherein the keyboard can be pulled out as desired, so that the display screen that lies under it is visible. This is, e.g., appropriate, if a menu is indicated on the second display screen, in order to be able to utilize the entire display surface of the main display screen [for the presentation].

If a second person is to be shown a presentation, the main display screen is rotated out by at least 220 degrees or more, so that the second person can now view the main display screen. The image of the main display screen is rotated by 180 degrees by a control device.

The operator controls the presentation by means of the keyboard, a mouse or other input devices and follows the course of the presentation on the second display screen with the function of a control display screen.

The second display screen can be turned on and the image of the main display screen can be rotated out selectively and manually by means of a switch or by keyboard input. However, according to claim 5, an automatic turning on and rotation of the image is appropriate, e.g., by coupling the hinge with a device that recognizes a rotating angle, which causes the image of the main display screen to rotate by 180 degrees and also the second display screen is turned on when a predetermined rotating angle of the main display screen is present.

According to claim 6, the second display screen is a black-and-white display screen. This enhancement is advantageous, e.g., if a time-consuming color graphic is to be shown on the main display screen to the customer, which is, e.g., an attractive and convincing presentation. The operator, i.e., the salesman, does not need this high-value presentation. He only needs to be able the follow the presentation and to be able to check that the input is correct, if inputs are made, e.g., personal data of the customer.

Since the second display screen also requires a smaller resolution, it is more cost-favorable than the main display screen, whereby total costs can be reduced.

According to claim 7, the keyboard can be removed as desired, whereby the communication with the computer is made by means of a wireless data interface. This option is then of advantage, if the presentation device, e.g., is to stand next to the customer.

The object is further solved with a device according to claims 8 and 12.

According to claim 8, the notebook has a main display screen, an integrated computer and a current supply, as is usual for conventional laptops, notebooks, etc. In addition, a second display screen is provided, which is arranged in the slot for the CD-ROM drive or a slot provided particularly for this purpose. Since two display screens are to be controlled, it is clear to the person of average skill in the art that the electronics necessary for this purpose must also be provided.

In addition, a control unit is provided, which rotates the image of the main display screen by 180 degrees for the presentation, so that it is correct for observation. It is clear to the person of average skill in the art that the hinges for this must be appropriately configured.

If the notebook is to be used for the presentation, the main display screen will rotate out at an angle of approximately 270 degrees, so that a roof-like structure of approximately 90 degrees can be set up in a stationary manner on a table. The observer, e.g., a customer, who sits opposite the operator, can view quite well the main display screen, and e.g., follow the displayed development of his life insurance.

The operator, e.g., the insurance salesman, can thus follow the input on the second display screen, and the screen can be driven laterally by an electric motor so that it travels out from a slot after a specific keyboard input or after actuating a switch, so that the observer can view it. Although this monitoring display screen is essentially smaller than the main display screen, this size is fully sufficient for monitoring the input.

When the presentation has terminated, the monitoring display screen is again driven by an electric motor or manually to travel back into the slot.

According to claim 9, the flat display screen unit can be easily removed from the base unit. This measure provides user-friendly service.

According to claim 10, the flat display unit is arranged in the slot for the disk drive. This form of embodiment is particular advantageous, since a conventional notebook need only be changed in its construction at the hinges and can be used as a conventional notebook without limitations. This form of embodiment is particularly cost-favorable. It is clear to the person of average skill in the art that the electrical plug connection must be designed and wired for this purpose.

According to claim 11, the main display screen is designed for contact-sensitive input, whereby the operator can immediately recognize on the second image screen, i.e., on the monitoring display screen, which position of the main display screen, on which, e.g., a diagram is shown, the customer touches with his finger or with a pen.

Claim 12 concerns an independent invention. A flat display screen unit is designed such that it can be utilized in the slot provided in the notebook for a CD-ROM drive, instead of this drive, whereby the slot, however, is arranged at the side edge of the notebook. The flat display screen unit contains a drive with an electric motor, which drives the flat display screen in and out, as is usual for a CD-ROM drive.

The forms of embodiment of the invention are explained on the basis of the appended schematic drawings.

Figure 1:
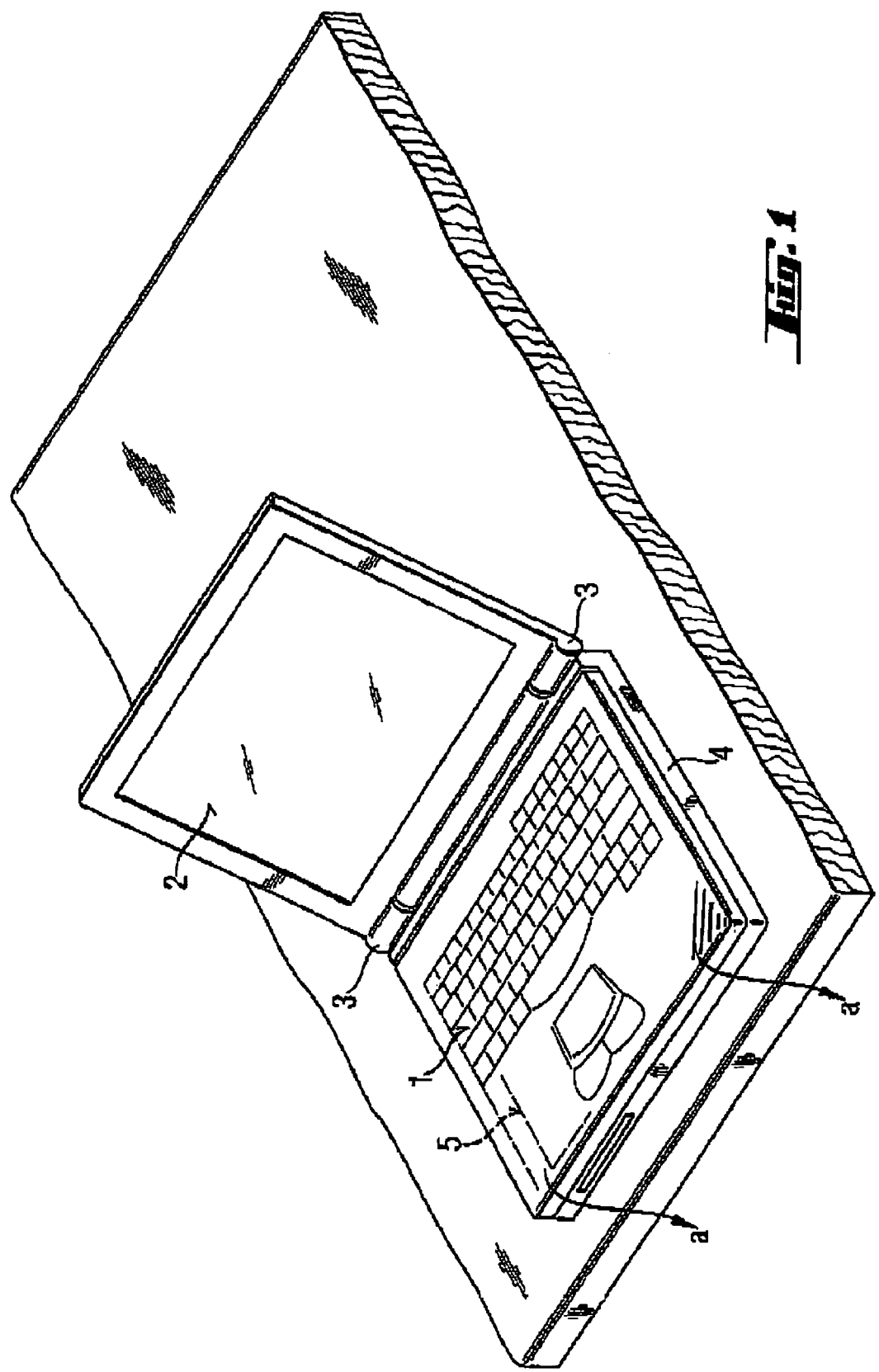
FIG. 1 shows a perspective lateral view of a first form of embodiment of the invention for conventional use as a laptop.

FIG. 1 shows a perspective lateral view of the invention for conventional use as a laptop with a keyboard 1, a main display screen 2, which is attached with hinges 3 to a base unit 4 of the laptop, so that it can be rotated out. It is also possible, if desired, to remove keyboard 1. The keyboard with separate power supply means can be coupled in a wireless manner in this example by means of a conventional infrared interface, whereby it is up to the person with average skill in the art also to utilize other wireless couplings.

Figure 2:
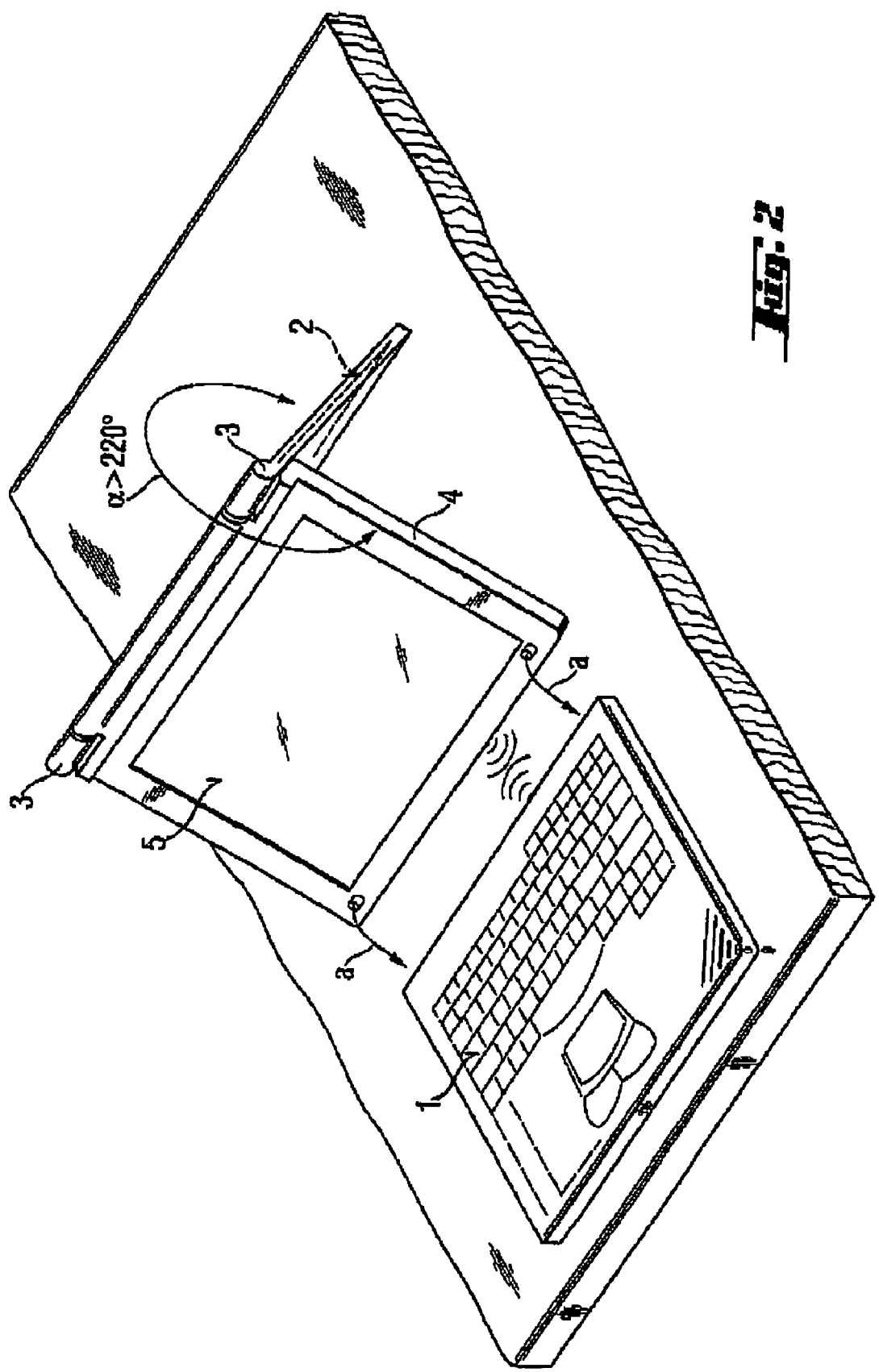
FIG. 2 shows a perspective lateral view of the invention according to FIG. 1 for use as a presentation device.

FIG. 2 shows the invention for use as a presentation device. The IR-coupled keyboard 1 is removed, so that the operator can view a second display screen 5. The main display screen 2 is rotated out as a first display screen, as shown by the double arrow. The customer thus can view correctly the image of the main display screen, if this image is rotated electronically by 180 degrees.

Figure 3:
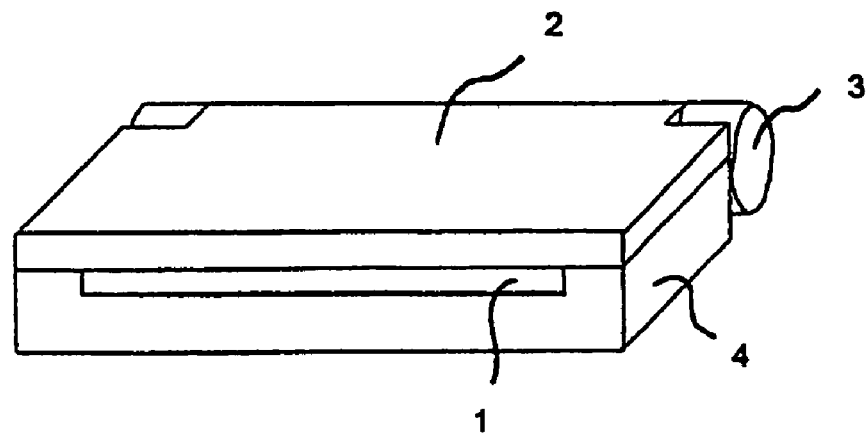
FIG. 3 shows a perspective lateral view of a second form of embodiment of the invention for conventional use as a laptop.

FIG. 3 shows a perspective lateral view of the invention for conventional use as a laptop with a keyboard 1, a main display screen 2, which is attached with hinges 3 to a base unit 4 of the laptop in such a way that it can be rotated out. It is also possible, if desired, to pull out the keyboard.

Figure 4:
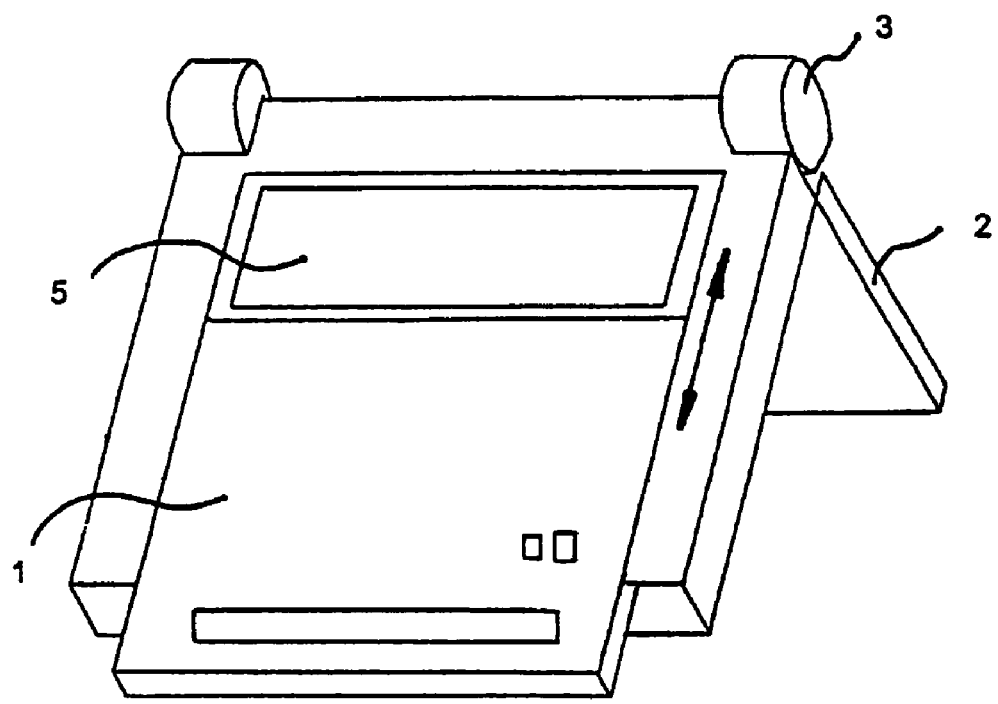
FIG. 4 shows a perspective lateral view of the invention according to FIG. 3 for use as a presentation device.

FIG. 4 shows the invention for use as a presentation device. Keyboard 1 is pulled out, so that the operator can view the second display screen 5. The main display screen 2 is rotated out, as shown by the double arrow. The customer can observe the image correctly on the main display screen, if it is electronically rotated by 180 degrees.

Figure 5:
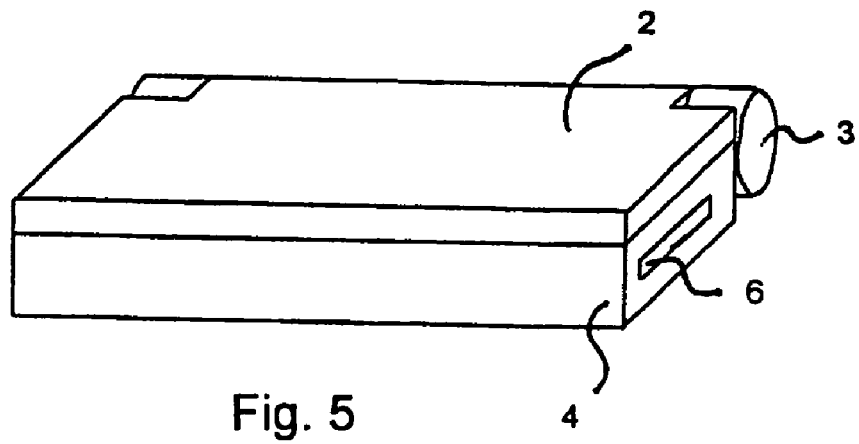
FIG. 5 shows a perspective lateral view of a third form of embodiment of the invention for conventional use as a laptop.

FIG. 5 shows a notebook in the closed state. It does not differ from a conventional notebook and has a slot 6 for the uptake of additional devices.

Figure 6:
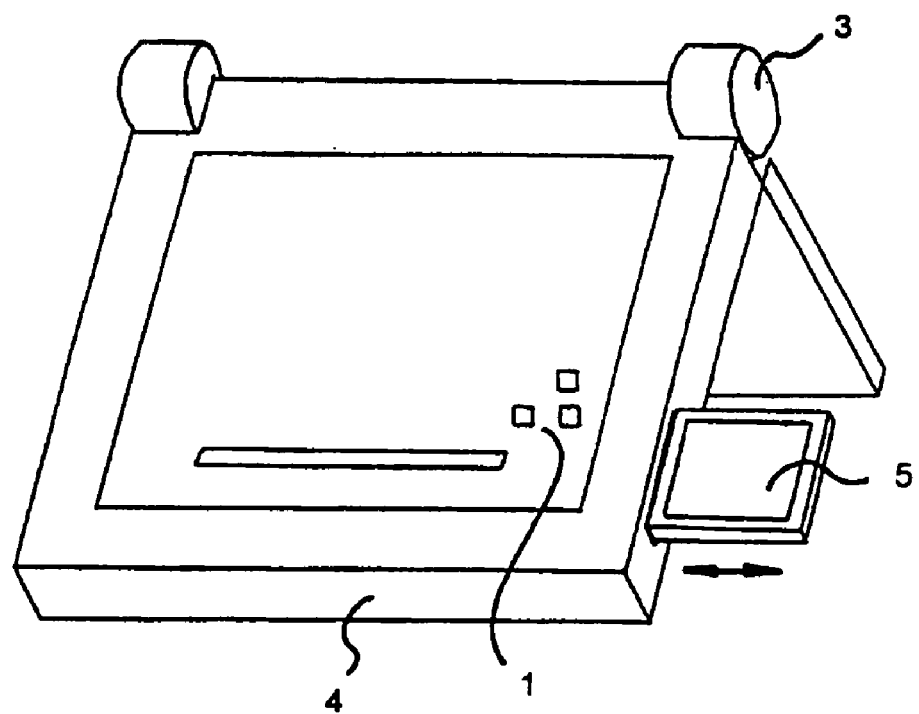
FIG. 6 shows a perspective lateral view of the invention according to FIG. 5 for use as a presentation device.

FIG. 6 shows the notebook as a presentation device. The main display screen 2 is rotated out at an angle of approximately 270 degrees, so that a roof-like structure is formed, which is arranged in a stationary manner between the customer and the salesman. A slot 6, e.g., for a CD-ROM drive is arranged on the cross side of base unit 4 of the notebook. A control monitoring unit with a flat display screen 5 that can travel out is found in this slot 6. If the presentation device is to be used, the image on main display screen 2 is rotated electronically by 180 degrees, so that the customer can observe an image that is an upright-positioned and laterally correct image. The flat image screen 5 of a control monitoring unit is made to travel out by means of a drive with an electric motor, by means of a switch or by a keyboard input, and then can be viewed by the salesman for monitoring the input.

The configuration of the electric-motor drive of the control monitoring unit for moving out the flat image screen 5 can be omitted for the person of average skill in the art, since no inventive activity is involved. The same is true for the creation of the control electronics for rotating the image of the main display screen by 180 degrees and for the control of the flat display screen 5 of the control monitoring unit.

In summary, it is established that the subjects of claims 1, 4 and 8 are based on a uniform basic principle. According to this construction principle, the secondary image screen 5 is arranged underneath keyboard 1, the primary image screen 2 can be rotated out at an angle of at least 220 degrees, and the image of the primary display screen 2 can be rotated by 180 degrees.

The configuration of the secondary image screen 5 depends on the requirements. It is possible to select the secondary image screen as a small unit and/or for black-and-white display. In this case, it serves only as an input monitoring means for input of letters or numbers. It is also possible to select a secondary display screen of the same quality as the primary display screen if, e.g., the presentation device will also be used as a game console, whereby two players sit opposite one another and look only at their own display screens in order to play e.g., a card game.

The invention claimed is:

1. A presentation device, comprising:
   a base unit including operating components and having integrated therein a auxiliary display screen;
   a keyboard detachably received by the base unit above the auxiliary display screen and constructed for wireless connection to the base unit;
   a main display screen swingably mounted to the base unit for rotation about a rotating angle of at least 220 degrees so as to allow disposition of the main display screen in a first operating position in which the presentation device is useable as a laptop computer and a second operating position in which the presentation device is useable for dual display mode in combination with the auxiliary display screen; and
   a control device for rotating an image on the main display screen by 180 degrees, when the main display screen is in the second operating position.

2. The presentation device of claim 1, wherein the base unit assumes an inclined disposition in the second operating position.

3. The presentation device of claim 1, wherein the control device is constructed to respond to a rotation of the main display screen about a predetermined rotating angle by rotating the image of the main display screen by 180 degrees and by turning on the auxiliary display screen.

4. The presentation device of claim 1, wherein the auxiliary display screen is smaller than the main display screen.

5. The presentation device of claim 1, wherein the main display screen is designated for contact-sensitive input.

6. The presentation device of claim 1, wherein the keyboard is detachably received in a pocket of the base unit, said pocket being sized for flush disposition of the keyboard with respect to an upper surface of the base unit.

7. The presentation device of claim 1, wherein the keyboard is constructed for detachable placement upon the base unit.

* * * * *